Patented Mar. 1, 1949

2,462,863

UNITED STATES PATENT OFFICE 2,462,863

SULFUR DIOXIDE TREATMENT OF IRISH MOSS RESIDUE

Mattie P. Hess, Maywood, and Arthur E. Siehrs, Chicago, Ill., assignors to Krim-Ko Corporation, Chicago, Ill., a corporation of Illinois No Drawing. Original application March 1, 1945, Serial No. 580,492. Divided and this application November 21, 1947, Serial No. 787,476

2 Claims. (Cl. 260—209)

The current invention relates to certain valuable discoveries in connection with the treatment of marine-plants, more particularly that type commonly known as carrageen or Irish moss, the present novel procedure resulting in the production of a gelose or mucilaginous extract from such Irish moss, which, when incorporated in a chocolate-flavor syrup, can be mixed, without heating, with cold milk to provide a suitable stabilized chocolate-flavor milk in which the cocoa-particles will remain substantially-uniformly suspended over an indefinite period.

The discovery is based on the theory that such mosses contain or embody at least two extractable substances, hereinafter designated by the letter "A" and "B," respectively, of different functional properties.

Such Extract A is a gel-forming substance which, when incorporated in a chocolate-flavor syrup and the latter mixed with milk, will exert its maximum suspending effect on the cocoa-particles of the drink only after such mixture of milk and syrup is suitably heated, such heating in commercial practices being usually designated as 145° Fahr. for thirty minutes, although lower temperatures may be used, but longer periods of mixing are then necessary to attain the same effect. However, it is not possible to mix this type of chocolate-flavor syrup containing Extract A with a cold mixture, that is, for example, with milk at 36° Fahr. and have suspension of the cocoa-particles occur in the resulting product.

On the other hand, Extract B provides its paramount or maximum suspending or sustaining effect when the chocolate-flavor syrup containing it is mixed with cold milk at about 36° Fahr. and, in this case, this different Extract B will immediately begin to apply its suspending power and it is possible to obtain thereby commercially-stable chocolate-flavor milk without the necessity of applying heat as is required in the case of the use of Extract A.

Different mosses, or the same mosses grown under different conditions of nutrition and temperature, or a single moss in varying stages of development, may yield different amounts of the Extracts A and B, it being borne in mind, that normally, neither the sources of Extract A nor B are soluble in sea-water, probably because of the suppressing influence of the salts in the sea-water.

The current invention provides a procedure for obtaining the heretofore unknown and therefore unavailable product B from the moss in commercially substantial quantities so that the extract can be employed for its special purposes such as the suspension of fibrous materials in aqueous media, for example, cocoa in milk at a dairy providing a cold process chocolate-flavor drink, pharmaceutical-emulsions, ice cream, etc. and all of the uses of Extract A where it is disadvantageous to employ a heating or cooking process or where the viscosity must be maintained low.

The improved modus operandi resulting from the present discovery provides a substantial increase in a valuable product produced from the moss over that procurable by other procedures.

The current important revelation is founded on the fact that the refuse or residue resulting from the segregation of the extractible substances from Irish moss in a heated or boiling water-solution at atmospheric pressure still contains large amounts of potential product not obtainable by ordinary means, and, in the case of the large majority of mosses grown in the coastal waters of North America this unreleased or heretofore unavailable substance is primarily Extract B, our investigations and experiments having indicated that this source of Extract B is locked up in the fibers of the residue in such a manner as to prevent its procurement by heat at 212° Fahr.

Considered somewhat differently, our invention, more particularly, refers to water-extractions of Irish moss whose dried solids react with some of the constituents of cold milk to provide the required stabilizing effect.

It is therefore one of the principal objects of our invention to provide a form of dried extract offering the valuable thickening and stabilizing properties inherent in Irish moss, a further purpose of the invention being to provide a stabilizing substance made from Irish moss which may be introduced directly into dairy product compositions without modification of the usual manufacturing procedures or the subjecting of the compositions to heating.

Another important aim of the invention is to utilize profitably the by-product extraction residues resulting from the preparation of the conventional Irish moss extracts, an added salient feature of the invention being to increase the total yield of commercially-utilizable extract that may be obtained from the Irish moss.

If the moss is subjected to the action of hot-water at a temperature, for example, from 180° Fahr. to 212° Fahr. substantially all of the Extract A will be withdrawn therefrom and form a solution with the water, and, in addition, an amount of the substance B will be extracted and also go into the solution, but the amount of Extract B in such solution will depend upon the quantity thereof which is free to be extracted into a hot water-solution at atmospheric pressure.

If this aqueous double-extract of the moss is then dried to a solid, or if the soluble double-extract is prepared in dry form by any convenient means, the resulting product will have the properties of Extract A and Extract B in proportion to the percentages of these substances present in the dried product. So far as is known, up to the present time, neither Extract A nor Extract B has been isolated by anyone except the present inventors.

It is highly desirable to produce Extract B in as pure a form as possible, because in numerous cases the presence of Extract A is detrimental to the use of the Irish moss extract when the Extract B properties alone are desired.

An example of this, as indicated above, is the case of a chocolate-flavor syrup which is designed to be mixed, without heating, with cold milk so that a stabilized chocolate-flavor milk will be produced without the necessity of heating the mixture. If the extract prepared from Irish moss contains a substantial portion of Extract B then such a suitable chocolate-flavor syrup can be made, but if the extract contains a fairly large amount of Extract A, then the resulting syrup will be very thick and it will be necessary to use greater amounts of the mixed extract in order to obtain the desired cold suspending strength. As the proportion of Extract A becomes greater in the dried extract, the syrup becomes too thick to be useful commercially and the cost of the stabilizing-agent becomes greater. For this reason, it is highly desirable to have a dried Extract B in as pure a state as possible, so that the resulting chocolate-syrup in which it is used will be very thin and the amount of stabilizing or suspending agent required will be low.

We have been able to obtain such a dried Extract B or cold mix stabilizer by treating the residues of prior 180° Fahr. extraction chemically by a suitable reagent, such as sulfite or other sulphur-dioxide producing compounds and, in carrying out this process the residue from the prior extraction is treated for various periods of time with different amounts of a sulfite, or sulphur-dioxide producing compound, at room temperature, and then the residue is washed thoroughly and extracted with fresh water at 180° Fahr., the extract then being filtered and dried in the usual manner.

The following table shows that with this particular type of moss the strength of the Extract B increased with increasing amounts of sodium-bisulfite, or substances which will release sulphur-dioxide, up to 20% of sodium-bisulfite of the weight of the dry moss and that a greater percentage is seemingly injurious. This figure, however would vary with different types of moss especially as a function of the amount of oxidizable substances present, as impurities in the moss.

In this connection, as with other Irish moss extracts, it is necessary to adjust the acidity and to maintain it as close to neutral as possible, because it has been shown that Irish moss extracts are more stable at a pH of 7 or slightly alkaline, and that the Irish moss extracts tend to break down under heating under the influence of acidity.

| Percent Sodium Bisulfite Used | Time of Sulfite Treatment | pH of Liquid Extract | Yield Dried Extract | Viscosity of Chocolate Milk [1] Containing .054% Extract | Sedimentation |
|---|---|---|---|---|---|
| | | | | Seconds | |
| 0% of Residue | 0 | 7.25 | 9.12 | 24.0 | cocoa settling. |
| 12% of Residue | 45 min | 5.5 | 48.6 | 56.0 | none. |
| 16% of Residue | 45 min | 5.38 | 44.6 | 62.0 | Do. |
| 20% of Residue | 45 min | 4.9 | 55.7 | 73.0 | Do. |
| 24% of Residue | 45 min | 4.9 | 43.0 | 33.0 | cocoa settling. |
| 16% of Residue | 45 min | 4.6 | 52.9 | 36.0 | none. |
| 16% of Residue | 90 min | 4.2 | 56.2 | 36.0 | Do. |
| 16% of Residue | 3 hrs | 4.15 | 68.9 | 46.0 | Do. |
| Whole Moss Control | 180° F. Extraction, No sulfite. | 6.3 | 64.2 | 26.0 | cocoa settling. |

[1] Chocolate milks prepared by mixing 1 part of chocolate syrup (containing 0.6% dried extract) with 10 parts of cold milk (2% Fat).
The viscosity of the chocolate milk is directly proportional to the number of seconds a given volume of this milk at 50° Fahr. takes to run out of a standard viscosimeter tube.

It is seemingly of the essence of our discovery that the refuse or fibrous residues, resulting from the prior extraction of crude Irish moss with hot or boiling water still contain large amounts of colloidal substance of high viscosity and stabilizing capacity which is not recoverable by ordinary methods.

Whether this substance characterized as Extract B herein is initially locked up in the fiber of the moss in a manner which precludes its extraction by a single boiling, or is some new cleavage product formed from the fiber or from some other not initially obtained substance is at present somewhat conjectural.

We have discovered that the Irish moss exhausted residues of boiling-water extractions may be made to yield, under suitable conditions of processing, large increments of extract not heretofore obtainable either from the residues or from the whole moss by any of the usual known means.

Our novel process comprises subjecting the moss residue to aqueous extraction under conditions which favor molecular or structural cleavage while at the same time inhibiting hydrolysis in the indicated supplemental procedure, the extraction, whatever it may be, being evidenced by a profound physical change in the moss refuse undergoing extraction in that it loses its brittleness and becomes soft and pliable, and with the release of the colloidal principle, the surface of the moss becomes slimy to the touch, these changes not occuring when exhausted moss fiber is boiled in water in the usual manner.

This is seemingly evidence of a chemical change in the colloidal constituents of the treated residue.

Sulfites have the properties of breaking down the fibrous material in the Irish moss residue and in place of sodium-bisulfite potassium-bisulfite could be used or sulfites in general can be employed, or sulphurous-acid or sulphur-dioxide in gaseous form.

The amount of sulfite used is such as to loosen the fibrous structure and yet be not enough to destroy or detrimentally affect the moss extract later obtained.

All of these various chemicals provide the active agent, sulphur-dioxide, which also has the effect of bleaching the moss.

The washing after the sulfite treatment, is, of course, for the purpose of removing the remaining sulfite.

The B extract is dissolved in the syrup while the latter is hot, that is, at the time the syrup is made, the latter not ordinarily being susceptible of production cold.

All cold mixed syrups now in the trade can be used either cold or hot but not necessarily equally favorably.

If the syrup contains only extract B, or only a high percentage of such extract, then the syrup can be used satisfactorily either hot or cold, but if the syrup also contains a substantial amount of Extract A then it cannot be gratifyingly used with heated milk, the reason being that when a syrup containing a substantial amount of Extract A is heated with milk and subsequently cooled, the product may be too thick to be satisfactory commercially, one distinction between Extracts A and B being that the former is a gelling agent and the latter is a non-gelling agent.

It is seemingly new to provide a product consisting principally of Extract B, either in the form of powder, or dissolved in water, or dissolved in chocolate syrup.

In passing, is may be mentioned that the ash-content, by which is meant the weight of material remaining after Extract B has been burned, under some conditions is desirably much lower than in Irish moss extracts prepared by any other means up to the present time, this being also true of the nitrogenous and fatty materials.

Moreover, extract A is probably a colloidal substance plus other colloidal or non-colloidal substances which may modify the property of such an extract, whereas Extract B is seemingly purely colloidal.

Whereas, some emphasis has been indicated on the use of this Extract B in a syrup to be introduced into milk it is to be borne in mind that such extract is capable of desirable employment in other relations.

This patent application is a division from our earlier pending application Serial No. 580,492, Irish moss extract and its production, filed March 1, 1945.

We claim:

1. The process of extracting a carbohydrate product from Irish moss residue which has been previously freed from substantially all of the constituents of the original Irish moss extractible by hot fresh water at atmospheric pressure and at a temperature between 180° and 212° Fahr. including subjecting such residue to the action of sulphur-dioxide for from about 30 to 60 minutes, freeing the treated residue from the remaining sulphur-dioxide, if any, then extracting the gelose from such treated residue by hot fresh water, drying such gelose, and then powdering the same.

2. The process of extracting a carbohydrate product from Irish moss residue which has been previously freed from at least 80% of the constituents of the original Irish moss extractible by hot fresh water at atmospheric pressure and at a temperature between 180° and 212° Fahr. including subjecting such residue to the action of sulphur-dioxide for from about 30 to 60 minutes, freeing the treated residue from the remaining sulphur-dioxide, if any, then subjecting the residue to the action of hot water at 180° Fahr. to extract its extractible constituents, and then drying and powdering the extract.

MATTIE P. HESS.
ARTHUR E. SIEHRS.

REFERENCES CITED

The following references are of record in the file of this patent:

Lawall et al.: J. Am. Pharm. Assoc., v. 21 (1932), pp. 1146–1153.